(12) United States Patent
Tang

(10) Patent No.: US 11,310,785 B2
(45) Date of Patent: *Apr. 19, 2022

(54) CHANNEL TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/626,110

(22) PCT Filed: Sep. 21, 2018

(86) PCT No.: PCT/CN2018/107126
§ 371 (c)(1),
(2) Date: Dec. 23, 2019

(87) PCT Pub. No.: WO2019/062677
PCT Pub. Date: Apr. 4, 2019

(65) Prior Publication Data
US 2020/0220701 A1    Jul. 9, 2020

(30) Foreign Application Priority Data

Sep. 30, 2017    (WO) ................ PCT/CN2017/105012

(51) Int. Cl.
*H04L 5/10*    (2006.01)
*H04L 5/00*    (2006.01)
(Continued)

(52) U.S. Cl.
CPC ......... *H04W 72/042* (2013.01); *H04L 1/1819* (2013.01); *H04L 5/0048* (2013.01);
(Continued)

(58) Field of Classification Search
CPC ........... H04W 72/042; H04W 72/1273; H04W 80/02; H04L 5/0048; H04L 5/0051; H04L 5/0055; H04L 5/10; H04L 1/1819
(Continued)

(56) References Cited

U.S. PATENT DOCUMENTS

2012/0020323 A1 * 1/2012 Noh ...................... H04L 5/0048
370/330
2013/0265955 A1   10/2013 Kim et al.
(Continued)

FOREIGN PATENT DOCUMENTS

CN    101989970 A    3/2011
CN    102055689 A    5/2011
(Continued)

OTHER PUBLICATIONS

Huawei et al: "Multiplexing different types of RSs for DL and UL", 3GPP Draft; R1-1715470, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18-21, 2017 Sep. 17, 2017 (Sep. 17, 2017), XP051338938, [retrieved on Sep. 17, 2017].
(Continued)

*Primary Examiner* — Candal Elpenord
(74) *Attorney, Agent, or Firm* — Perkins Coie LLP

(57) ABSTRACT

Embodiments of the present invention provide a channel transmission method, a terminal device and a network device, which can reduce overheads in resource scheduling while the flexibility is improved. The method comprises: a terminal device transmits a first channel based on a first
(Continued)

resource in a resource set in at least two resource sets, different resource sets in the at least two resource sets respectively corresponding to different demodulation reference signal (DMRS) mapping types, the DMRS mapping types comprising a type A and a type B; the first channel being transmitted based on a DMRS mapping type corresponding to a resource set to which the first resource belongs, or the transmission of the first channel being for hybrid automatic repeat request acknowledgement (HARQ ACK) information of a second channel and the second channel being transmitted based on a DMRS mapping type corresponding to a resource set to which the first resource belongs.

20 Claims, 5 Drawing Sheets

(51) Int. Cl.
| | | |
|---|---|---|
| *H04L 1/18* | (2006.01) | |
| *H04W 72/12* | (2009.01) | |
| *H04W 72/04* | (2009.01) | |
| *H04W 80/02* | (2009.01) | |

(52) U.S. Cl.
CPC .......... *H04L 5/0051* (2013.01); *H04L 5/0055* (2013.01); *H04L 5/10* (2013.01); *H04W 72/1273* (2013.01); *H04W 80/02* (2013.01)

(58) Field of Classification Search
USPC .................................................. 370/329–330
See application file for complete search history.

(56) References Cited

U.S. PATENT DOCUMENTS

| | | | |
|---|---|---|---|
| 2014/0036810 A1* | 2/2014 | Harrison | H04W 72/0413 370/329 |
| 2015/0063236 A1 | 3/2015 | Seo et al. | |
| 2015/0215908 A1 | 7/2015 | Seo et al. | |
| 2015/0358124 A1* | 12/2015 | Suzuki | H04L 5/0053 370/329 |
| 2016/0006548 A1 | 1/2016 | Yang et al. | |
| 2017/0245251 A1 | 8/2017 | Kim et al. | |
| 2018/0227156 A1* | 8/2018 | Papasakellariou | H04W 72/0453 |
| 2018/0234277 A1* | 8/2018 | Akkarakaran | H04L 5/0035 |
| 2018/0279305 A1* | 9/2018 | Bagheri | H04W 72/044 |
| 2019/0082427 A1 | 3/2019 | Kim et al. | |
| 2019/0268095 A1 | 8/2019 | Yeo et al. | |
| 2019/0268889 A1 | 8/2019 | Kim et al. | |
| 2019/0342944 A1 | 11/2019 | Chatterjee et al. | |
| 2019/0393992 A1 | 12/2019 | Xiong et al. | |
| 2020/0068566 A1 | 2/2020 | Gao et al. | |
| 2020/0077370 A1 | 3/2020 | Qu et al. | |
| 2020/0229220 A1 | 7/2020 | Seo et al. | |

FOREIGN PATENT DOCUMENTS

| | | |
|---|---|---|
| CN | 102404854 A | 4/2012 |
| CN | 102869096 A | 1/2013 |
| CN | 103166880 A | 6/2013 |
| CN | 104081872 A | 10/2014 |
| CN | 106487487 A | 3/2017 |
| CN | 106559363 A | 4/2017 |
| CN | 111052666 A | 4/2020 |
| EP | 3606240 A1 | 2/2020 |
| RU | 2598533 C1 | 9/2016 |
| TW | 201642614 A | 12/2016 |
| WO | 2011153859 A1 | 12/2011 |
| WO | 2013134272 A1 | 9/2013 |
| WO | 2015137770 A1 | 9/2015 |
| WO | 2016163623 A1 | 10/2016 |
| WO | 2019050306 A1 | 3/2019 |

OTHER PUBLICATIONS

Intel Corporation: "DL and UL scheduling and HARQ feedback in NR", 3GPP Draft: R1-1716321 Intel Schedharq, 3rd Generation Partnership Project (3GPP), Mobile Competence Centre; 650. Route Des Lucioles; F-06921 Sophia-Antipolis Cedex; France vol. RAN WG1, No. Nagoya, Japan Sep. 18-21, 2017 Sep. 12, 2017 (Sep. 21, 2017), XP051329912; [retrieved on Sep. 12, 2017].
First Office Action of the European application No. 18862675.8, dated Jan. 25, 2021.
Notice of Allowance of the Russian application No. 2020101593, dated Dec. 17, 2020.
First Office Action of the Canadian application No. 3066665, dated Feb. 17, 2021.
Notice of Allowance of the U.S. Appl. No. 16/724,072, dated Mar. 2, 2021.
First Office Action of the American U.S. Appl. No. 16/724,072, dated Mar. 17, 2020.
English translation of the Written Opinion of the International Search Authority in the international application No. PCT/CN2017/105012, dated Apr. 28, 2018.
English translation of the Written Opinion of the International Search Authority in the international application No. PCT/CN2018/107126, dated Nov. 28, 2018.
First Office Action of the Chinese application No. 201911326453.2, dated Nov. 3, 2020.
Advisory Action of the U.S. Appl. No. 16/724,072, dated Oct. 23, 2020.
SAMSUNG. On SS Block/PDSCH/DMRS Multiplexing. 3GPP TSG RAN WG1 Meeting #90 R1-1714586. Aug. 25, 2014 (Aug. 25, 2014), entire document.
International Search Report in the international application No. PCT/CN2017/105012, dated Apr. 28, 2018 (2 pages).
International Search Report in the international application No. PCT/CN2018/107126, dated Nov. 28, 2018 (2 pages).
MCC Support; Final Report of 3GPP TSG RAN WG1 #AH_NR2 v1.0.0 (Qingdao, China, Jun. 27-30, 2017) 3GPP TSG RAN WG1 Meeting #90, R1-1712032, Prague, Czech Rep, Aug. 21-25, 2017.
MCC Support; Final Report of 3GPP TSG RAN WG1 #AH_NR3 v1.0.0 (Nagoya, Japan, Sep. 18-21, 2017) 3GPP TSG RAN WG1 Meeting #90bis, R1-1716942, Prague, Czech Rep, Oct. 9-13, 2017.
LG Electronics: "Consideration on PUCCH resource allocation for NR", 3GPP Draft; R1-1715883, 3rd Generation Partnership Project (3GPP), MobileCompetence Centre; 650, Route Des Lucioles; F-06921 Sophia-Antipolis; France, vol. RAN WG1, No. Nagoya, Japan; Sep. 18-21, 2017, Sep. 11, 2017 (Sep. 11, 2017), XP051329289, Retrieved from the Internet: URL: http://www.3gpp.org/ftp/tsgran/WG1RL1/TSGR1 AH/NR AH 1709/Docs/[ retrieved on Sep. 11, 2017] *the whole document*.
Nokia et al: "PUCCH Resource Allocation and PUCCH Transmit Diversity", 3GPP Draft; R1-1716146 PUCCH Resource Allocation and PUCCH Transmit Diversity, 3rd Generation Partnership Project (3GPP), Mobile Competence Centre; 650, Route Des Lucioles; F-06921 Sophia-Antipolis, vol. RAN WG1, No. Nagoya, Japan; Sep. 18-21, 2017, Sep. 17, 2017 (Sep. 17, 2017), XP051339604, Retrieved from the Internet: RL: http://www.3gpp.org/ftp/Meetings 3GPP SYNC/RAN1/DOCS/[ retrieved on Sep. 17, 2017]*p. 1-p. 5*.
3rd Generation Partnership Project; Technical Specification Group Services and System Aspects; Procedures for the 5G System; Stage 2 (Release 15), 3GPP TS 23.502 V15.0.0 (Dec. 2017).
3rd Generation Partnership Project; Technical Specification Group Radio Access Network; NR; Packet Data Convergence Protocol (PDCP) specification (Release 15), 3GPP TS 38.323 V15.1.0 (Mar. 2018).
Huawei et al: "Design of DMRS for DL/UL data transmission", 3GPP Draft; R1 -1715472, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18-21, 2017, Sep. 17, 2017 (Sep. 17, 2017), XP051338940, Retrieved from the Internet: URL: http://www.3gpp.org/ftp/Meetings 3GPP SYNC/RAN1/Docs/ [ retrieved on Sep. 17, 2017]* Sect.s 1,2, 3.3, 4 *.

(56) References Cited

OTHER PUBLICATIONS

QUALCOMM; "Remaining issues on NR DM-RS", 3GPP Draft; R1-1715082, 3rd Generation Partnership Project (3GPP), Mobile Competence Centre; 650, Route Des Lucioles; F-06921 Sophia-Anti Polis Cedex; France, vol. RAN WG1, No. Prague, Czech Republic; Aug. 21-25, 2017, Aug. 26, 2017 (Aug. 26, 2017), XP051328568, Retrieved from the Internet: URL: http://www.3gpp.org/ftp/tsg ran/WG1 RL1/TSGR1 90/Docs/[ retrieved on Aug. 26, 2017] * Sect.s 1.2, 1.3 *.
Supplementary European Search Report in the European application No. 17926623.4, dated Jul. 9, 2020.
Supplementary European Search Report in the European application No. 18862675.8, dated Jul. 2, 2020.
Final Office Action of the U.S. Appl. No. 16/724,072, dated Aug. 12, 2020.
First Office Action of the Chinese application No. 202010087295.6, dated May 8, 2021.
First Office Action of the European application No. 17926623.4, dated Mar. 18, 2021.
First Office Action of the Chilean application No. 201903696, dated Mar. 16, 2021.
Correction of Notice of Allowance of the U.S. Appl. No. 16/724,072, dated Mar. 18, 2021.
Second Office Action of the European application No. 18862675.8, dated Jul. 29, 2021. 4 pages.
Office Action of the Indian application No. 201917054212, dated Jun. 27, 2021. 6 pages with English translation.
3GPP TSG RAN WG1 Meeting AH_#NR3 R1-1715824, Nagoya, Japan, Sep. 18-21, 2017; Source: CATT Title: PDSCH and PUSCH resource allocation. 11 pages.
3GPP TSG RAN WG1 Meeting NR#3 R1-1716190, Nagoya, Japan, Sep. 18-21, 2017; Agenda Item 3.3.3 2; Source: AT&T; Title: HARQ Management for Mini-Slot based Transmissions. 7 pages.
3GPP TSG RAN WG1 Meeting NR#3 R1-1715691, Nagoya, Japan, Sep. 18-21, 2017; Source: Guangdong OPPO Mobile Telecom; Title: Multiplexing between slot-based and symbol-based transmissions and pre-emption indication. 3 pages.
Third Office Action of the Chinese application No. 202010087295.6, dated Nov. 17, 2021. 11 pages with English translation.
First Office Action of the Taiwanese application No. 107134567, dated Oct. 29, 2021. 12 pages with English translation.
First Office Action of the Japanese application No. 2020-500611, dated Oct. 1, 2021. 8 pages with English translation.
Second Office Action of the Canadian application No. 3066665, dated Oct. 27, 2021. 4 pages.
First Office Action of the Korean application No. 10-2020-7000322, dated Feb. 17, 2022. 13 pages with English translation.
Samsung, R1-1713604, Remaining details on UL DMRS, 3GPP TSG RAN WG1 #90, 3GPP (Aug. 11, 2017). 3 pages.
Third Office Action of the European application No. 18862675.8, dated Feb. 15, 2022. 5 pages.

* cited by examiner

CHANNEL TRANSMISSION METHOD, TERMINAL DEVICE, AND NETWORK DEVICE

CROSS-REFERENCE TO RELATED APPLICATIONS

The application is a national phase application of International Application No. PCT/CN2018/107126 filed on Sep. 21, 2018, and claims priority to PCT Application No. PCT/CN2017/105012 filed on Sep. 30, 2017, and entitled "Method for Indicating Channel Resource Set, Terminal Device and Network Device", the contents of which are hereby incorporated by reference in its entirety.

TECHNICAL FIELD

The disclosure relates to the field of information processing technologies, and particularly to a method for channel transmission, a terminal device and a network device.

BACKGROUND

In a Long Term Evolution (LTE) system, a Physical Uplink Control Channel (PUCCH) resource for a terminal may be indicated by a two-step method. Specifically, a base station configures a resource set including multiple candidate frequency-domain resources for the terminal through Radio Resource Control (RRC) signaling; and assigns, through Downlink Control Information (DCI), a frequency-domain resource in the resource set to the terminal for PUCCH transmission of the terminal.

A Fifth Generation (5G) New Radio (NR) system expects relatively high scheduling flexibility and a relatively low resource scheduling overhead.

Therefore, how to improve scheduling flexibility and reduce a resource scheduling overhead is an urgent problem to be solved.

SUMMARY

Embodiments of the disclosure provide a method for channel transmission, a terminal device and a network device, which may improve scheduling flexibility and may also reduce a resource scheduling overhead.

According to a first aspect, the embodiments of the disclosure provide a method for channel transmission, which may include the following operations.

A terminal device transmits a first channel based on a first resource in one of at least two resource sets.

Here, each of the at least two resource sets corresponds to a respective one of Demodulation Reference Signal (DMRS) mapping types.

Here, the first channel is transmitted based on the DMRS mapping type corresponding to the resource set to which the first resource belongs, or the first channel is used for transmitting Hybrid Automatic Repeat Request (HARQ) Acknowledgement (ACK) information for a second channel and the second channel is transmitted based on the DMRS mapping type corresponding to the resource set to which the first resource belongs.

According to a second aspect, the embodiments of the disclosure provide a method for channel transmission, which may include the following operations.

A network device receives, based on a first resource in one of at least two resource sets, a first channel transmitted by a terminal device.

Here, each of the at least two resource sets corresponds to a respective one of DMRS mapping types.

Here, the first channel is transmitted based on the DMRS mapping type corresponding to the resource set to which the first resource belongs, or the first channel is used for transmitting HARQ ACK information for a second channel and the second channel is transmitted based on the DMRS mapping type corresponding to the resource set to which the first resource belongs.

According to a third aspect, the embodiments of the disclosure provide a method for channel transmission, which may include the following operations.

A network device configures at least two resource sets for a terminal device.

The network device instructs the terminal device to select, from one of the at least two resource sets, a first resource for channel transmission, here, each of the at least two resource sets corresponds to a respective one of DMRS mapping types.

According to a fourth aspect, the embodiments of the disclosure provide a terminal device, which may include a communication unit.

The communication unit is configured to transmit a first channel based on a first resource in one of at least two resource sets.

Here, each of the at least two resource sets corresponds to a respective one of DMRS mapping types.

Here, the first channel is transmitted based on the DMRS mapping type corresponding to the resource set to which the first resource belongs, or the first channel is used for transmitting HARQ ACK information for a second channel and the second channel is transmitted based on the DMRS mapping type corresponding to the resource set to which the first resource belongs.

According to a fifth aspect, the embodiments of the disclosure provide a network device, which may include a communication unit.

The communication unit is configured to receive, based on a first resource in one of at least two resource sets, a first channel transmitted by a terminal device.

Here, each of the at least two resource sets corresponds to a respective one of DMRS mapping types.

Here, the first channel is transmitted based on the DMRS mapping type corresponding to the resource set to which the first resource belongs, or the first channel is used for transmitting HARQ ACK information for a second channel and the second channel is transmitted based on the DMRS mapping type corresponding to the resource set to which the first resource belongs.

According to a sixth aspect, the embodiments of the disclosure provide a network device, which may include a communication unit.

The communication unit is configured to configure at least two resource sets for a terminal device; and instruct the terminal device to select, from one of the at least two resource sets, a first resource for channel transmission, here, each of the at least two resource sets corresponds to a respective one of DMRS mapping types.

According to a seventh aspect, the embodiments of the disclosure provide a terminal device, which includes a processor and a memory configured to store a computer program capable of being run on the processor. The processor is configured to run the computer program to execute the method in the first aspect.

According to an eighth aspect, the embodiments of the disclosure provide a network device, which includes a processor and a memory configured to store a computer program capable of being run on the processor. The processor is configured to run the computer program to execute the method in the second aspect or the third aspect.

According to a ninth aspect, the embodiments of the disclosure provide a computer storage medium, which stores a computer-executable instruction that, when executed by a computer, causes the computer to implement the method in the first aspect.

According to a tenth aspect, the embodiments of the disclosure provide a computer storage medium, which stores a computer-executable instruction that, when executed by a computer, causes the computer to implement the method in the second aspect or the third aspect.

According to the technical solutions of the embodiments of the disclosure, a respective one resource set among different resource sets may be configured for each DMRS mapping type among different DMRS mapping types, so that corresponding candidate resources may be optimized for different DMRS mapping types. Thus, during each scheduling, resource selection and channel transmission may be performed based on the DMRS mapping types or the DMRS mapping types may be acquired based on channel transmission resources. Therefore, resource scheduling flexibility may be achieved, and a high signaling resource overhead may be avoided.

DETAILED DESCRIPTION

In order to make the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Figure 1:
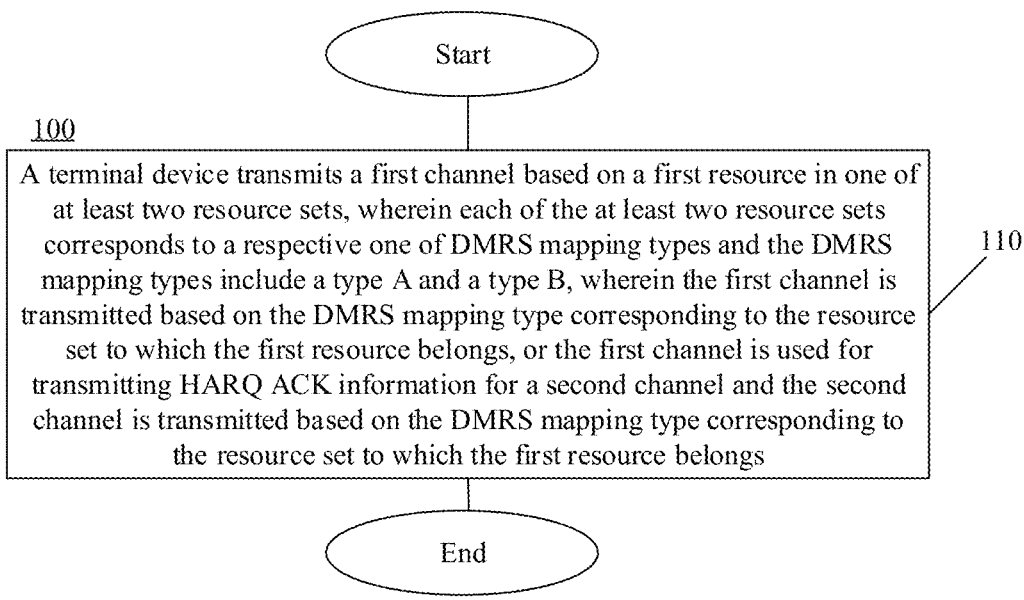
FIG. 1 is a flowchart of a method for channel transmission according to an embodiment of the disclosure.

As illustrated in FIG. 1, an embodiment of the disclosure provides a method 100 for channel transmission. The method 100 may be performed by a terminal device. The method includes at least part of contents in the following contents.

In 110, the terminal device transmits a first channel based on a first resource in one of at least two resource sets. Here, each of the at least two resource sets corresponds to a respective one of DMRS mapping types, and the DMRS mapping types include a type A and a type B. Here, the first channel is transmitted based on the DMRS mapping type corresponding to the resource set to which the first resource belongs, or the first channel is used for transmitting HARQ ACK information for a second channel and the second channel is transmitted based on the DMRS mapping type corresponding to the resource set to which the first resource belongs.

In the embodiment of the disclosure, the DMRS mapping type A may be a first DMRS mapping type, and the DMRS mapping type B may be a second DMRS mapping type.

In the above embodiment of the disclosure, each of different resource sets may correspond to a respective one of different DMRS mapping types. In an embodiment of the disclosure, each of different resource sets may also correspond to a respective one of different scheduling types. Sizes of resources scheduled based on different scheduling types may be different. For example, it may be classified into a type of slot-based scheduling or a type of symbol-based scheduling. For another example, it may be classified into a type of scheduling based on a small number of symbols or a type of scheduling based on a large number of symbols.

Figure 2:
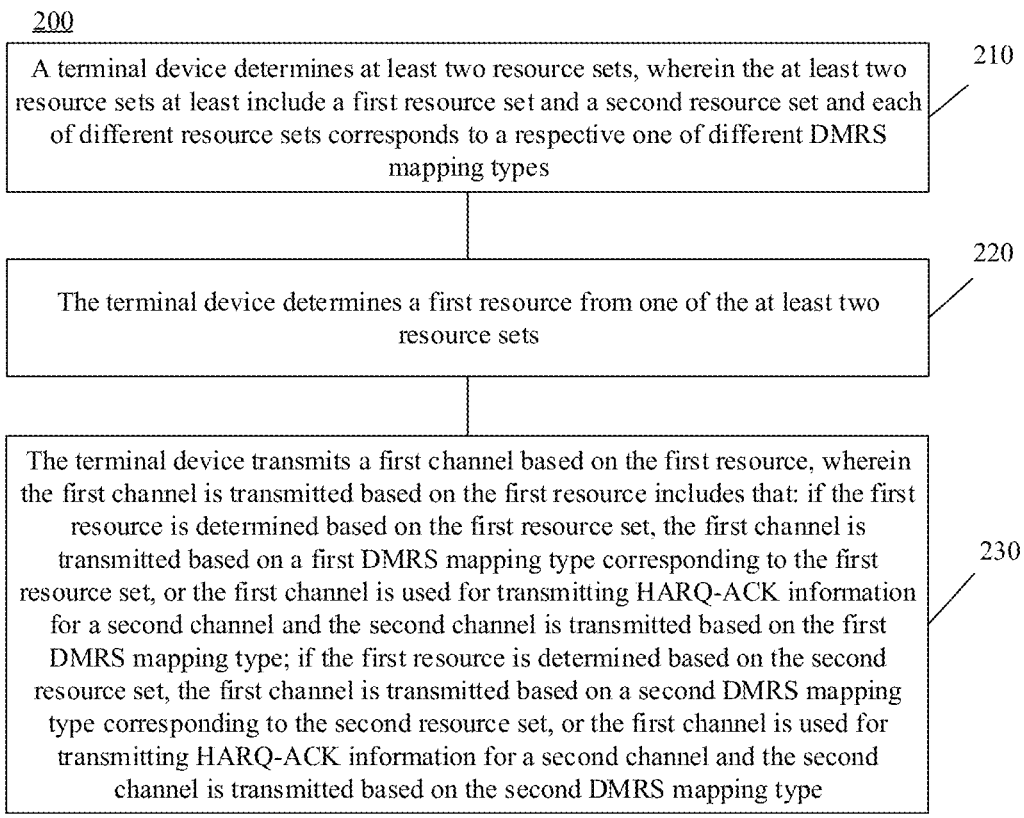
FIG. 2 is a flowchart of another method for channel transmission according to an embodiment of the disclosure.

As illustrated in FIG. 2, an embodiment of the disclosure provides a method 200 for channel transmission. The method may be performed by a terminal device. The method includes at least part of contents in the following contents.

In 210, the terminal device determines at least two resource sets, here, the at least two resource sets at least include a first resource set and a second resource set and each of different resource sets corresponds to a respective one of different DMRS mapping types.

In 220, the terminal device determines a first resource from one of the at least two resource sets.

In 230, the terminal device transmits a first channel based on the first resource. Here, the first channel is transmitted based on the first resource includes the following operations. If the first resource is determined based on the first resource set, the first channel is transmitted based on a first DMRS mapping type corresponding to the first resource set; or the first channel is used for transmitting HARQ-ACK information for a second channel and the second channel is transmitted based on the first DMRS mapping type. If the first resource is determined based on the second resource set, the first channel is transmitted based on a second DMRS mapping type corresponding to the second resource set; or the first channel is used for transmitting HARQ-ACK information for a second channel and the second channel is transmitted based on the second DMRS mapping type.

Specific implementation of the embodiment of the disclosure will be described below. The following descriptions are applied to the method 100 and the method 200.

In the embodiment of the disclosure, the terminal device may be a device capable of accessing a communication network, such as a mobile phone and a tablet computer.

In the embodiment of the disclosure, each of the at least two resource sets includes at least one of: a time-domain resource, a frequency-domain resource or a code-domain resource.

Specifically, each resource set may include: at least one one-dimensional resource or at least one multi-dimensional resource.

In addition, one of the at least two resource sets is at least partially different from the other of the at least two resource sets in terms of at least one of: the time-domain resource, the frequency-domain resource or the code-domain resource. Or one of the at two resource sets is completely different from the other of the at least two resource sets in terms of at least one of: the time-domain resource, the frequency-domain resource or the code-domain resource.

The "different" mentioned here may be a difference in dimensions of the resources in the resource sets. For example, one resource set includes time-domain and frequency-domain resources and the other resource set includes frequency-domain and code-domain resources. Or the "different" may also mean that the dimensions of the resources in the resource sets are the same, but sizes of the resources in the resource sets are different and/or positions of the resources in the resource sets are different.

In the embodiment of the disclosure, manners in which the terminal determines the at least two resource sets may include the following manners.

In one implementation manner, the terminal device determines configurations of at least one of the first resource set or the second resource set based on preset information.

Specifically, the terminal may determine the configurations of the at least one of the first resource set or the second resource set according to predefined information.

Here, the preset information or the predefined information may be information which is preset on a terminal side according to information acquired by other operations.

In another implementation manner, the terminal determines configurations of the at least two resource sets according to first signaling transmitted by a network side. Specifically, the terminal device may determine the configurations of at least one of the first resource set or the second resource set according to the first signaling transmitted by a network device. The first signaling is RRC signaling or System Information (SI).

In the embodiment of the disclosure, manners in which the terminal device determines the first resource from one of the at least two resource sets may include the following manners.

In one implementation manner, the terminal device determines the first resource from the one of the at least two resource sets according to first control information transmitted by the network side.

Here, the first control information includes number information of the first resource in the one of the at least two resource sets.

Specifically, when the at least two resource sets include the first resource set and the second resource set, the terminal determines the first resource from the first resource set or the second resource set according to the first control information transmitted by the network device.

Here, the first control information includes the number information of the first resource in the first resource set or the second resource set.

In another implementation manner, the terminal device determines the first resource from the one of the at least two resource sets according to a format of first control information or according to indication information of the DMRS mapping type from the network side.

Here, the format of the first control information may be a DCI format.

That is, the terminal may determine, according to the format (for example, the DCI format) of the first control information or according to the indication information of the DMRS mapping type from the network device, whether the first resource is determined based on the first resource set or based on the second resource set.

In the embodiment of the disclosure, the first control information may be at least one of DCI or a Media Access Control (MAC) Control Element (CE).

In the embodiment of the disclosure, when the first channel is transmitted based on the first DMRS mapping type (i.e., the type A) corresponding to the first resource set, or the first channel is used for transmitting the HARQ-ACK information for the second channel and the second channel is transmitted based on the first DMRS mapping type, the terminal device determines a position of at least one DMRS symbol according to a starting symbol of a slot in which the channel is transmitted.

In the embodiment of the disclosure, a time-domain resource is indicated, by taking at least one of slot or symbol as a unit, for the first channel or second channel transmitted based on the first DMRS mapping type.

Specifically, the at least two resource sets include the first resource set, the DMRS mapping type corresponding to the first resource set is the type A, and a time-domain resource in the first resource set is in units of at least one of slots or symbols.

Here, the position of the at least one DMRS symbol is in a third time-domain symbol or fourth time-domain symbol of the slot.

In the embodiment of the disclosure, the first channel is transmitted based on the second DMRS mapping type corresponding to the second resource set; or the first channel is used for transmitting the HARQ-ACK information for the second channel and the second channel is transmitted based on the second DMRS mapping type. The method further includes the following operation.

In the first channel or second channel transmitted based on the second DMRS mapping type A, the position of at least one DMRS symbol is determined according to a starting symbol of a group of symbols.

Specifically, the position of the at least one DMRS symbol in the channel transmitted based on the second DMRS mapping type is determined according to the starting symbol of the group of symbols. The group of symbols includes symbols in which the data channel and a DMRS for the data channel are transmitted. The at least one DMRS symbol is one of: a first symbol in the group of symbols; a symbol in the group of symbols, and the symbols is within a central range; an odd symbol in the group of symbols; or an even symbol in the group of symbols.

Here, the symbol is within the central range, which may mean that the symbol is at a middle symbol of all the symbols. For example, if the total number of the symbols is an even number N, the symbol may be the $(N/2)^{th}$ symbol or $(N/2+1)^{th}$ symbol. Whether it is specifically the $(N/2)^{th}$ symbol or $(N/2+1)^{th}$ symbol depends on whether an odd symbol or an even symbol is selected.

In the embodiment of the disclosure, a time-domain resource is indicated by taking a symbol as a unit. The time-domain resource is indicated, by taking symbol as the unit, for the channel transmitted based on the second DMRS mapping type.

Specifically, the at least two resource sets include the second resource set, the DMRS mapping type corresponding to the second resource set is the type B, and the time-domain resource in the second resource set is in units of symbols.

In such a manner, according to the technical solution of the embodiment of the disclosure, a respective one of different resource sets may be configured for each of different DMRS mapping types, so that corresponding candidate resources may be optimized for different DMRS mapping types. Thus, during each scheduling, channel transmission may be performed based on the DMRS mapping types or the DMRS mapping types may be acquired based on the resources for channel transmission. Therefore, resource scheduling flexibility may be achieved, and a signaling overhead may be avoided.

Furthermore, according to the embodiment of the disclosure, a respective one of different resource sets may be configured for each of different scheduling types and DMRS mapping types, so that corresponding candidate resources may be optimized for different scheduling types and DMRS mapping types. Thus, during each scheduling, selection of a resource set and determination of a specific resource are performed based on network-side information (for example, indication information of a scheduling type, indication information of a DMRS mapping type, a DCI format corresponding to a DMRS mapping type, and a DCI) and the channel is transmitted on the determined resource. Therefore, the problem that flexibility of resource scheduling of each scheduling type is limited due to unified configurations of one or an aggregate of PUCCH resource sets for multiple scheduling types or corresponding DCI formats (here, configurations of one or an aggregate of PUCCH resource sets mean that configured resources are not distinguished based on DMRS mapping types or scheduling types) is solved. According to the solution of the disclosure, flexibility of the resource scheduling of each scheduling type may be improved, higher efficient resource utilization rate and transmission performance for channel transmission are achieved, and a higher signaling overhead is avoided.

In addition, whether the first resource is determined based on the first resource set or the second resource set may be determined according to existing network-side information (for example, a DCI format, or indication information of the DMRS mapping type or of the scheduling type) without any additional signaling indication, so that the signaling transmission overhead is further reduced.

In the embodiment of the disclosure, the resource sets are distinguished based on the corresponding DMRS mapping types. That is, a resource set corresponding to a DMRS mapping type may be called a resource set. In the embodiment of the disclosure, at least two resource sets may also be referred to collectively as a resource set, and resources in the resource set may correspond to the DMRS mapping type A or the DMRS mapping type B.

Figure 3:
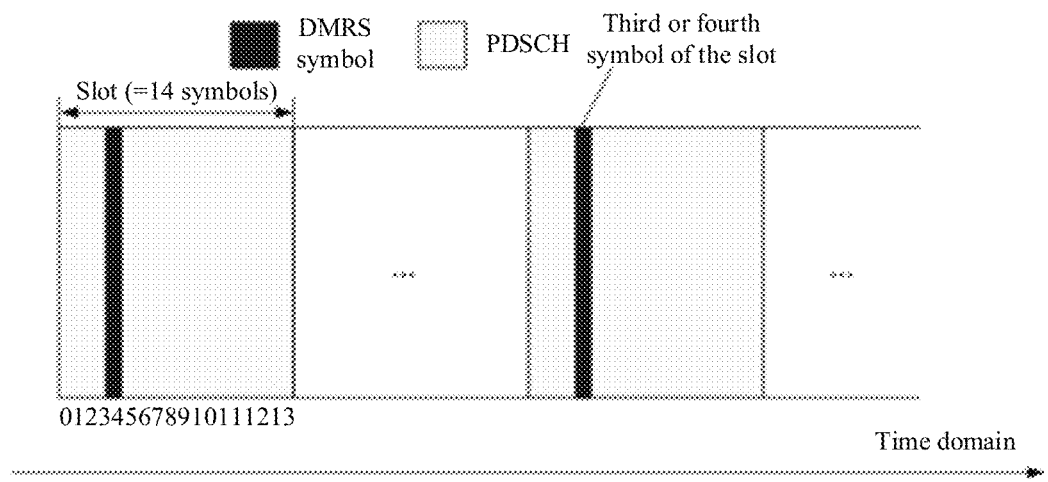
FIG. 3 is a diagram of a DMRS mapping type according to an embodiment of the disclosure.
Figure 4:
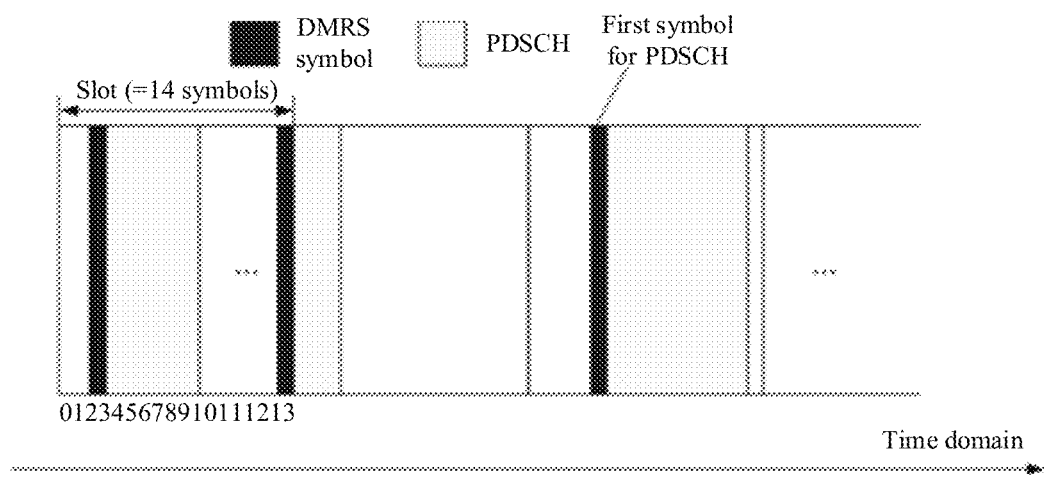
FIG. 4 is a diagram of another DMRS mapping type according to an embodiment of the disclosure.

Descriptions will be made with an example. For example, a Physical Downlink Shared Channel (PDSCH) resource set is configured for each of two DMRS mapping types. The two PDSCH DMRS mapping types include the DMRS mapping type A (as illustrated in FIG. 3) and the DMRS mapping type B (as illustrated in FIG. 4).

Here, one or more parameters characterizing a resource in a resource set include at least one of: a position of a starting symbol, the number of symbols, the number of slots, a frequency-domain resource or a code-domain resource. The at least two resource sets are optionally different in at least one of: a type of a parameter characterizing a resource in the resource set, a value range of a parameter of the same type, or the number of values available for a parameter of the same type.

Here, the at least two resource sets are different in at least one of: the number of positions of starting symbols, a value range of a position of a starting symbol, or a value range of a granularity of resources.

Specifically, in a PDSCH adopting the DMRS mapping type A, a position of a DMRS symbol is determined by taking a starting symbol of a slot where the PDSCH is located as a reference position (for example, a first DMRS symbol is always a third or fourth symbol of the slot), and the DMRS mapping type A is used for the slot-based scheduling, namely the scheduling is performed by taking slot as a unit. In a PDSCH adopting the DMRS mapping type B, a position of a DMRS symbol is determined by taking a first symbol of symbols occupied by the PDSCH as a reference position (for example, a first DMRS symbol is always a first symbol occupied by the PDSCH), and the DMRS mapping type B is used for the non-slot-based scheduling, namely the scheduling is performed by taking symbol as a unit.

In the embodiment, a PDSCH resource set A is configured for the DMRS mapping type A (slot-based scheduling) and a PDSCH resource set B is configured for the DMRS mapping type B (non-slot-based scheduling). The resources in the PDSCH resource set A are different from the resources in the PDSCH resource set B. As illustrated in the embodiment, the PDSCH resource set A includes resources with four different numbers of slots, only includes resources with two kinds of starting symbols and does not include resources with different numbers of symbols; and the PDSCH resource set B includes resources with four different kinds of starting symbols, does not include resources with different numbers of slots but includes resources with two different numbers of symbols.

TABLE 1

Configuration of PDSCH Resource Set A for DMRS Mapping Type A (slot-based scheduling)

| Resource number | The number of Slots | Position of a starting symbol | Frequency-domain resource position |
| --- | --- | --- | --- |
| 00 | 1 | Symbol 0 | Frequency-domain position 1 |
| 01 | 1 | Symbol 3 | Frequency-domain position 1 |
| 02 | 1 | Symbol 0 | Frequency-domain position 2 |
| 03 | 1 | Symbol 3 | Frequency-domain position 2 |
| 04 | 2 | Symbol 0 | Frequency-domain position 1 |
| 05 | 2 | Symbol 3 | Frequency-domain position 1 |
| 06 | 2 | Symbol 0 | Frequency-domain position 2 |
| 07 | 2 | Symbol 3 | Frequency-domain position 2 |
| 08 | 4 | Symbol 0 | Frequency-domain position 1 |
| 09 | 4 | Symbol 3 | Frequency-domain position 1 |
| 10 | 4 | Symbol 0 | Frequency-domain position 2 |
| 11 | 4 | Symbol 3 | Frequency-domain position 2 |
| 12 | 8 | Symbol 0 | Frequency-domain position 1 |
| 13 | 8 | Symbol 3 | Frequency-domain position 1 |

TABLE 1-continued

Configuration of PDSCH Resource Set A for
DMRS Mapping Type A (slot-based scheduling)

| Resource number | The number of Slots | Position of a starting symbol | Frequency-domain resource position |
|---|---|---|---|
| 14 | 8 | Symbol 0 | Frequency-domain position 2 |
| 15 | 8 | Symbol 3 | Frequency-domain position 2 |

TABLE 2

Configuration of PDSCH Resource Set B for DMRS
Mapping Type B (non-slot-based scheduling)

| Resource number | Position of a starting symbol | The number of Symbols | Frequency-domain resource position |
|---|---|---|---|
| 00 | Symbol 0 | 1 symbol | Frequency-domain position 1 |
| 01 | Symbol 0 | 2 symbols | Frequency-domain position 1 |
| 02 | Symbol 0 | 1 symbol | Frequency-domain position 2 |
| 03 | Symbol 0 | 2 symbols | Frequency-domain position 2 |
| 04 | Symbol 3 | 1 symbol | Frequency-domain position 1 |
| 05 | Symbol 3 | 2 symbols | Frequency-domain position 1 |
| 06 | Symbol 3 | 1 symbol | Frequency-domain position 2 |
| 07 | Symbol 3 | 2 symbols | Frequency-domain position 2 |
| 08 | Symbol 6 | 1 symbol | Frequency-domain position 1 |
| 09 | Symbol 6 | 2 symbols | Frequency-domain position 1 |
| 10 | Symbol 6 | 1 symbol | Frequency-domain position 2 |
| 11 | Symbol 6 | 2 symbols | Frequency-domain position 2 |
| 12 | Symbol 9 | 1 symbol | Frequency-domain position 1 |
| 13 | Symbol 9 | 2 symbols | Frequency-domain position 1 |
| 14 | Symbol 9 | 1 symbol | Frequency-domain position 2 |
| 15 | Symbol 9 | 2 symbols | Frequency-domain position 2 |

According to the solution, resource configurations of the PDSCH resource set A may be optimized for slot-based scheduling and resource configurations of the PDSCH resource set B may be optimized for non-slot-based scheduling. The PDSCH adopting slot-based scheduling is usually needed to be transmitted in multiple continuous slots to achieve better network coverage, and thus the resource set A is more suitable for use. The PDSCH adopting non-slot-based scheduling is usually needed to be transmitted in 1 or 2 symbols to implement low-latency transmission, and thus the resource set B is more suitable for use. Compared with sharing the same resource set (i.e., that resources in the resource set are not distinguished based on the DMRS mapping types) for the DMRS mapping type A (slot-based scheduling) and the DMRS mapping type B (non-slot-based scheduling), this manner may achieve higher scheduling flexibility and reduce the number of resources in each resource set, thereby reducing a signaling overhead of DCI when resource numbers in the resource set are indicated by the DCI.

Descriptions will be made with an example. For example, a PUSCH resource set is configured for each of two DMRS mapping types.

Here, one or more parameters characterizing a resource in a resource set include at least one of: a position of a starting symbol, the number of symbols, the number of slots, a frequency-domain resource, or a code-domain resource. The at least two resource sets are optionally different in at least one of: a type of a parameter characterizing a resource in the resource set, a value range of a parameter of the same type, or the number of values available for a parameter of the same type.

Here, the at least two resource sets are different in at least one of: the number of positions of starting symbols, a value range of a position of a starting symbol, or a value range of a granularity of resources.

Figure 5:
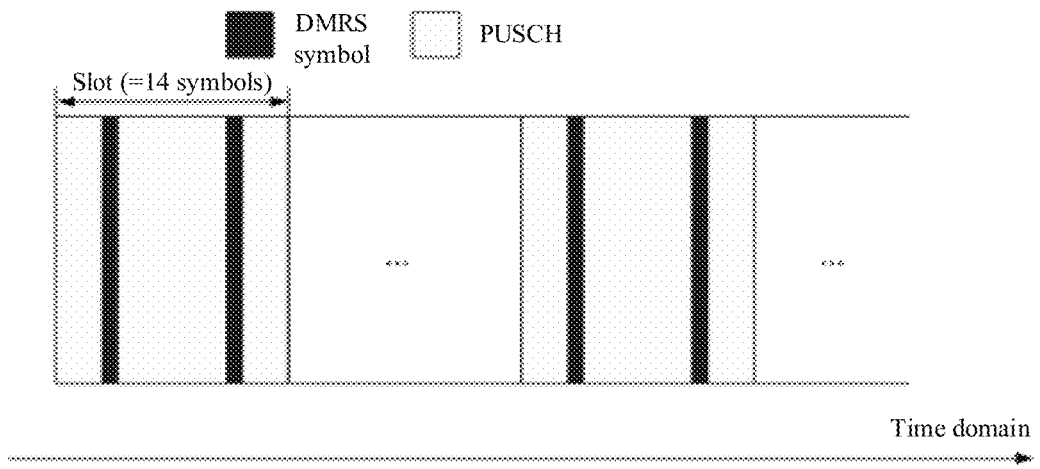
FIG. 5 is a diagram of yet another DMRS mapping type according to an embodiment of the disclosure.
Figure 6:
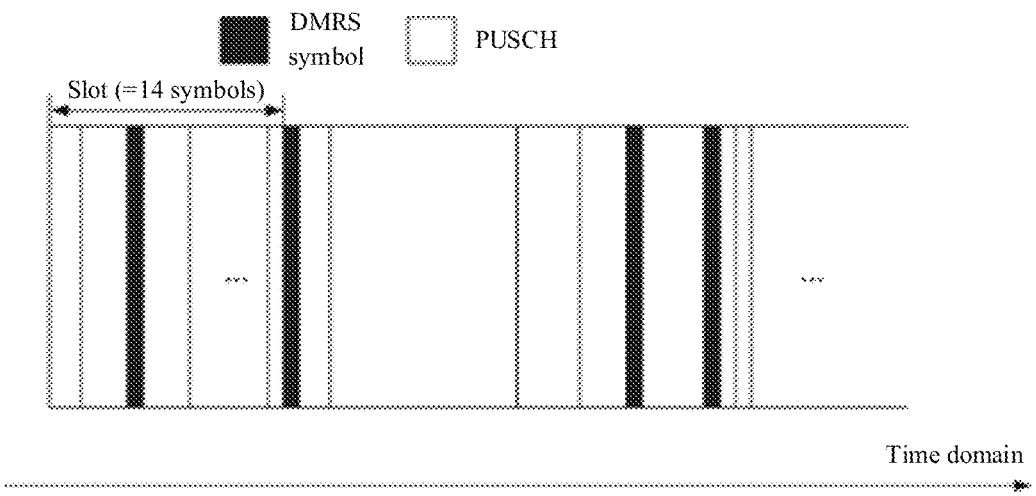
FIG. 6 is a diagram of still another DMRS mapping type according to an embodiment of the disclosure.

Specifically, two scheduling types (as illustrated in FIG. 5 and FIG. 6) for a Physical Uplink Shared Channel (PUSCH) include: slot-based scheduling, i.e., the scheduling is performed by taking slot as a unit; and non-slot-based scheduling, i.e., the scheduling is performed by taking symbol as a unit. In the embodiment, a PUSCH resource set A is configured for the DMRS mapping type A (slot-based scheduling) and a PUSCH resource set B is configured for the DMRS mapping type B (non-slot-based scheduling). The resources in the PUSCH resource set A are different from the resources in the PUSCH resource set B. As illustrated in the embodiment, the PUSCH resource set A includes resources with four different numbers of slots, only includes resources with two kinds of starting symbols and does not include resources with different numbers of symbols; and the PUSCH resource set B includes resources with four different kinds of starting symbols, does not include resources with different numbers of slots but includes resources with two different numbers of symbols.

TABLE 3

Configuration of PUSCH Resource Set A for
DMRS Mapping Type A (slot-based scheduling)

| Resource number | The number of slots | Position of a starting symbol | Frequency-domain resource position |
|---|---|---|---|
| 00 | 1 | Symbol 0 | Frequency-domain position 1 |
| 01 | 1 | Symbol 3 | Frequency-domain position 1 |
| 02 | 1 | Symbol 0 | Frequency-domain position 2 |
| 03 | 1 | Symbol 3 | Frequency-domain position 2 |
| 04 | 2 | Symbol 0 | Frequency-domain position 1 |
| 05 | 2 | Symbol 3 | Frequency-domain position 1 |
| 06 | 2 | Symbol 0 | Frequency-domain position 2 |
| 07 | 2 | Symbol 3 | Frequency-domain position 2 |
| 08 | 4 | Symbol 0 | Frequency-domain position 1 |
| 09 | 4 | Symbol 3 | Frequency-domain position 1 |
| 10 | 4 | Symbol 0 | Frequency-domain position 2 |
| 11 | 4 | Symbol 3 | Frequency-domain position 2 |
| 12 | 8 | Symbol 0 | Frequency-domain position 1 |
| 13 | 8 | Symbol 3 | Frequency-domain position 1 |

TABLE 3-continued

Configuration of PUSCH Resource Set A for
DMRS Mapping Type A (slot-based scheduling)

| Resource number | The number of slots | Position of a starting symbol | Frequency-domain resource position |
|---|---|---|---|
| 14 | 8 | Symbol 0 | Frequency-domain position 2 |
| 15 | 8 | Symbol 3 | Frequency-domain position 2 |

TABLE 4

Configuration of PUSCH Resource Set B for DMRS
Mapping Type B (non-slot-based scheduling)

| Resource number | Position of a starting symbol | The number of symbols | Frequency-domain resource position |
|---|---|---|---|
| 00 | Symbol 0 | 1 symbol | Frequency-domain position 1 |
| 01 | Symbol 0 | 2 symbols | Frequency-domain position 1 |
| 02 | Symbol 0 | 1 symbol | Frequency-domain position 2 |
| 03 | Symbol 0 | 2 symbols | Frequency-domain position 2 |
| 04 | Symbol 3 | 1 symbol | Frequency-domain position 1 |
| 05 | Symbol 3 | 2 symbols | Frequency-domain position 1 |
| 06 | Symbol 3 | 1 symbol | Frequency-domain position 2 |
| 07 | Symbol 3 | 2 symbols | Frequency-domain position 2 |
| 08 | Symbol 6 | 1 symbol | Frequency-domain position 1 |
| 09 | Symbol 6 | 2 symbols | Frequency-domain position 1 |
| 10 | Symbol 6 | 1 symbol | Frequency-domain position 2 |
| 11 | Symbol 6 | 2 symbols | Frequency-domain position 2 |
| 12 | Symbol 9 | 1 symbol | Frequency-domain position 1 |
| 13 | Symbol 9 | 2 symbols | Frequency-domain position 1 |
| 14 | Symbol 9 | 1 symbol | Frequency-domain position 2 |
| 15 | Symbol 9 | 2 symbols | Frequency-domain position 2 |

According to the solution, resource configurations of the PUSCH resource set A may be optimized for slot-based scheduling and resource configurations of the PUSCH resource set B may be optimized for non-slot-based scheduling. The PUSCH based on slot-based scheduling is usually needed to be transmitted in multiple continuous slots to achieve better network coverage, and thus the resource set A is more suitable for use. The PUSCH based on non-slot-based scheduling is usually needed to be transmitted in 1 or 2 symbols to implement low-latency transmission, and thus the resource set B is more suitable for use. Compared with sharing the same resource set (here, resources in the resource set are not distinguished based on the scheduling types) for slot-based scheduling and non-slot-based scheduling, this manner may achieve higher scheduling flexibility and reduce the number of resources in each resource set, thereby reducing a signaling overhead of DCI when resource numbers in the resource set are indicated by the DCI.

Descriptions will now be made with an example. For example, two kinds of resource sets are configured for PUCCHs that carry HARQ-ACKs corresponding to PDSCHs based on two DMRS mapping types.

Here, one or more parameters characterizing a resource in a resource set include at least one of: a position of a starting symbol, the number of symbols, the number of slots, a frequency-domain resource, or a code-domain resource. The at least two resource sets are optionally different in at least one of: a type of a parameter characterizing a resource in the resource set, a value range of a parameter of the same type, or the number of values available for a parameter of the same type.

Here, the at least two resource sets are different from each other in at least one of: the number of positions of starting symbols, a vale range of a position of a starting symbol, or a value range of a granularity of resources.

Specifically, the PDSCH DMRS mapping types are the DMRS mapping type A (as illustrated in FIG. 3) and the DMRS mapping type B (as illustrated in FIG. 4). In the PDSCH based on the DMRS mapping type A, a position of a DMRS symbol is determined by taking a starting symbol of a slot where the PDSCH is located as a reference position (for example, a first DMRS symbol is always a third or fourth symbol of the slot), and the DMRS mapping type A is mainly used for slot-based scheduling, namely the scheduling is performed by taking slot as a unit. In the PDSCH based on the DMRS mapping type B, a position of a DMRS symbol is determined by taking a first symbol of symbols occupied by the PDSCH as a reference position (for example, a first DMRS symbol is always a first symbol occupied by the PDSCH), and the DMRS mapping type B is mainly used for non-slot-based scheduling, namely the scheduling is performed by taking symbol as a unit.

In the embodiment, a PUCCH resource set (i.e., a PUCCH resource set A) is configured for the PUCCH on which the HARQ-ACK corresponding to the PDSCH based on the DMRS mapping type A (slot-based scheduling) is carried, and a PUCCH resource set (i.e., a PUCCH resource set B) is configured for the PUCCH on which the HARQ-ACK corresponding to the PDSCH based on the DMRS mapping type B (non-slot-based scheduling) is carried. The resources in the PUCCH resource set A are different from the resources in the PUCCH resource set B. As illustrated in the embodiment, the PUCCH resource set A includes resources with four different numbers of slots, only includes resources with two kinds of starting symbols and does not include resources with different numbers of symbols; and the PUCCH resource set B includes resources with four different kinds of starting symbols, does not include resources with different numbers of slots but includes resources with two different numbers of symbols.

TABLE 5

Configuration of Resource Set A for PUCCH that
carry HARQ-ACK Corresponding to PDSCH adopting
DMRS Mapping Type A (slot-based scheduling)

| Resource number | The number of slots | Position of a starting symbol | Frequency-domain and code-domain resource set |
|---|---|---|---|
| 00 | 1 | Symbol 0 | Frequency-domain and code-domain resource set 1 |
| 01 | 1 | Symbol 4 | Frequency-domain and code-domain resource set 1 |
| 02 | 1 | Symbol 0 | Frequency-domain and code-domain resource set 2 |
| 03 | 1 | Symbol 4 | Frequency-domain and code-domain resource set 2 |
| 04 | 2 | Symbol 0 | Frequency-domain and code-domain resource set 1 |
| 05 | 2 | Symbol 4 | Frequency-domain and code-domain resource set 1 |

TABLE 5-continued

Configuration of Resource Set A for PUCCH that carry HARQ-ACK Corresponding to PDSCH adopting DMRS Mapping Type A (slot-based scheduling)

| Resource number | The number of slots | Position of a starting symbol | Frequency-domain and code-domain resource set |
|---|---|---|---|
| 06 | 2 | Symbol 0 | Frequency-domain and code-domain resource set 2 |
| 07 | 2 | Symbol 4 | Frequency-domain and code-domain resource set 2 |
| 08 | 4 | Symbol 0 | Frequency-domain and code-domain resource set 1 |
| 09 | 4 | Symbol 4 | Frequency-domain and code-domain resource set 1 |
| 10 | 4 | Symbol 0 | Frequency-domain and code-domain resource set 2 |
| 11 | 4 | Symbol 4 | Frequency-domain and code-domain resource set 2 |
| 12 | 8 | Symbol 0 | Frequency-domain and code-domain resource set 1 |
| 13 | 8 | Symbol 4 | Frequency-domain and code-domain resource set 1 |
| 14 | 8 | Symbol 0 | Frequency-domain and code-domain resource set 2 |
| 15 | 8 | Symbol 4 | Frequency-domain and code-domain resource set 2 |

TABLE 6

Configuration of Resource Set B for PUCCH that carry HARQ-ACK Corresponding to PDSCH adopting DMRS Mapping Type B (non-slot-based scheduling)

| Resource number | Position of a starting symbol | The number of symbols | Frequency-domain and code-domain resource set |
|---|---|---|---|
| 00 | Symbol 3 | 1 symbol | Frequency-domain and code-domain resource set 1 |
| 01 | Symbol 3 | 2 symbols | Frequency-domain and code-domain resource set 1 |
| 02 | Symbol 3 | 1 symbol | Frequency-domain and code-domain resource set 2 |
| 03 | Symbol 3 | 2 symbols | Frequency-domain and code-domain resource set 2 |
| 04 | Symbol 6 | 1 symbol | Frequency-domain and code-domain resource set 1 |
| 05 | Symbol 6 | 2 symbols | Frequency-domain and code-domain resource set 1 |
| 06 | Symbol 6 | 1 symbol | Frequency-domain and code-domain resource set 2 |
| 07 | Symbol 6 | 2 symbols | Frequency-domain and code-domain resource set 2 |
| 08 | Symbol 9 | 1 symbol | Frequency-domain and code-domain resource set 1 |
| 09 | Symbol 9 | 2 symbols | Frequency-domain and code-domain resource set 1 |
| 10 | Symbol 9 | 1 symbol | Frequency-domain and code-domain resource set 2 |
| 11 | Symbol 9 | 2 symbols | Frequency-domain and code-domain resource set 2 |
| 12 | Symbol 12 | 1 symbol | Frequency-domain and code-domain resource set 1 |
| 13 | Symbol 12 | 2 symbols | Frequency-domain and code-domain resource set 1 |
| 14 | Symbol 12 | 1 symbol | Frequency-domain and code-domain resource set 2 |
| 15 | Symbol 12 | 2 symbols | Frequency-domain and code-domain resource set 2 |

According to the solution, resource configurations of the PUCCH resource set A may be optimized for the PUCCH carrying the HARQ-ACK corresponding to the PDSCH adopting slot-based scheduling, and resource configurations of the PUCCH resource set B may be optimized for the PUCCH carrying the HARQ-ACK corresponding to the PDSCH adopting non-slot-based scheduling. The HARQ-ACK corresponding to the PDSCH adopting slot-based scheduling is usually needed to be carried on a PUCCH occupying multiple continuous slots to achieve better network coverage, and the resource set A is more suitable for use. The HARQ-ACK corresponding to the PDSCH adopting non-slot-based scheduling is usually needed to be carried on a PUCCH occupying 1 or 2 symbols to implement low-latency HARQ-ACK feedback, and the resource set B is more suitable for use. Compared with the manner that the same resource set is shared by the two PUCCHs, this manner may achieve higher scheduling flexibility and reduce the number of resources in each resource set, thereby reducing a signaling overhead of DCI when resource numbers in the resource set are indicated by the DCI.

Figure 7:
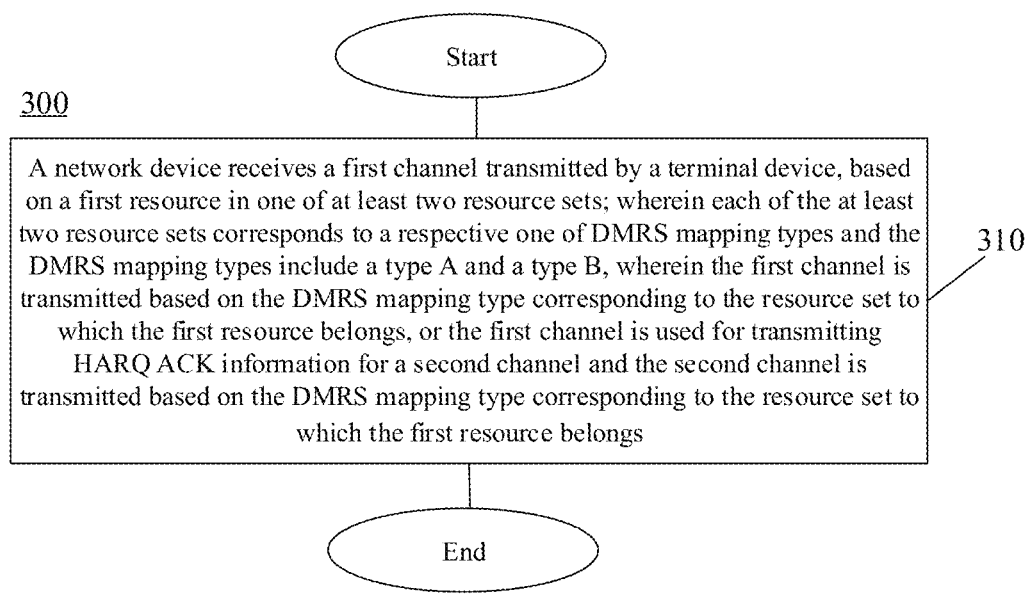
FIG. 7 is a flowchart of yet another method for channel transmission according to an embodiment of the disclosure.

FIG. 7 is a flowchart of a method 300 for channel transmission according to an embodiment of the disclosure. The method 300 includes at least part of contents in the following contents.

In 310, a network device receives, based on a first resource in one of at least two resource sets, a first channel transmitted by a terminal device. Here, each of the at least two resource sets corresponds to a respective one of DMRS mapping types, the DMRS mapping types include a type A and a type B. Here, the first channel is transmitted based on the DMRS mapping type corresponding to the resource set to which the first resource belongs, or the first channel is used for transmitting HARQ ACK information for a second channel and the second channel is transmitted based on the DMRS mapping type corresponding to the resource set to which the first resource belongs.

In the embodiment of the disclosure, each of the at least two resource sets includes at least one of: a time-domain resource, a frequency-domain resource, or a code-domain resource.

In the embodiment of the disclosure, a parameter characterizing a resource in the resource set includes at least one of: a position of a starting symbol, the number of symbols, the number of slots, a frequency-domain resource, or a code-domain resource.

In the embodiment of the disclosure, the at least two resource sets are different in at least one of: a type of a parameter characterizing a resource in the resource set, a value range of a parameter of the same type, or the number of values available for a parameter of the same type.

In the embodiment of the disclosure, the at least two resource sets are different in the number of positions of starting symbols and in a value range of a position of a starting symbol.

In the embodiment of the disclosure, the at least two resource sets are different in a value range of a granularity of resources.

In the embodiment of the disclosure, the network device indicates the at least two resource sets to the terminal device.

In an implementation manner, the network device transmits first signaling to the terminal device, here, the first signaling is used to indicate configurations of the at least two resource sets.

The first signaling may be RRC signaling or SI.

In another implementation manner, the network device transmits first control information to the terminal device, here, the first control information includes number information of the first resource in the one of the at least two resource sets.

In the embodiment of the disclosure, the network device indicates the first resource to the terminal device based on a format of the first control information.

The first control information may be at least one of DCI or a MAC CE.

In the embodiment of the disclosure, the network device transmits indication information to the terminal device, here, the indication information is used to indicate a DMRS mapping type or to indicate a scheduling type used in scheduling the first channel or the second channel.

In the embodiment of the disclosure, when the DMRS mapping type is the type A, the network device determines a position of at least one DMRS symbol according to a starting symbol of a slot in which the first channel or the second channel is transmitted.

In the embodiment of the disclosure, the at least one DMRS symbol is a third time-domain symbol or fourth time-domain symbol of the slot in which the first channel or the second channel is transmitted.

In the embodiment of the disclosure, when the DMRS mapping type is the type B, the network device determines a position of at least one DMRS symbol according to a starting symbol of a group of symbols.

Here, the group of symbols includes symbols in which the first channel and a DMRS are transmitted, or includes symbols in which the second channel and a DMRS are transmitted.

In the embodiment of the disclosure, the at least one DMRS symbol is at least one of: a first symbol in the group of symbols; a symbol in the group of symbols and the symbol is within a central range; an odd symbol in the group of symbols; or an even symbol in the group of symbols.

In the embodiment of the disclosure, the at least two resource sets include a first resource set, the DMRS mapping type corresponding to the first resource set is the type A, and a time-domain resource in the first resource set is in units of at least one of slots or symbols.

In the embodiment of the disclosure, the at least two resource sets include a second resource set, the DMRS mapping type corresponding to the second resource set is the type B, and a time-domain resource in the second resource set is in units of symbols.

The specific implementation of the method 300 may refer to descriptions about the methods 100 and 200 and, for simplicity, will not be elaborated herein.

Figure 8:
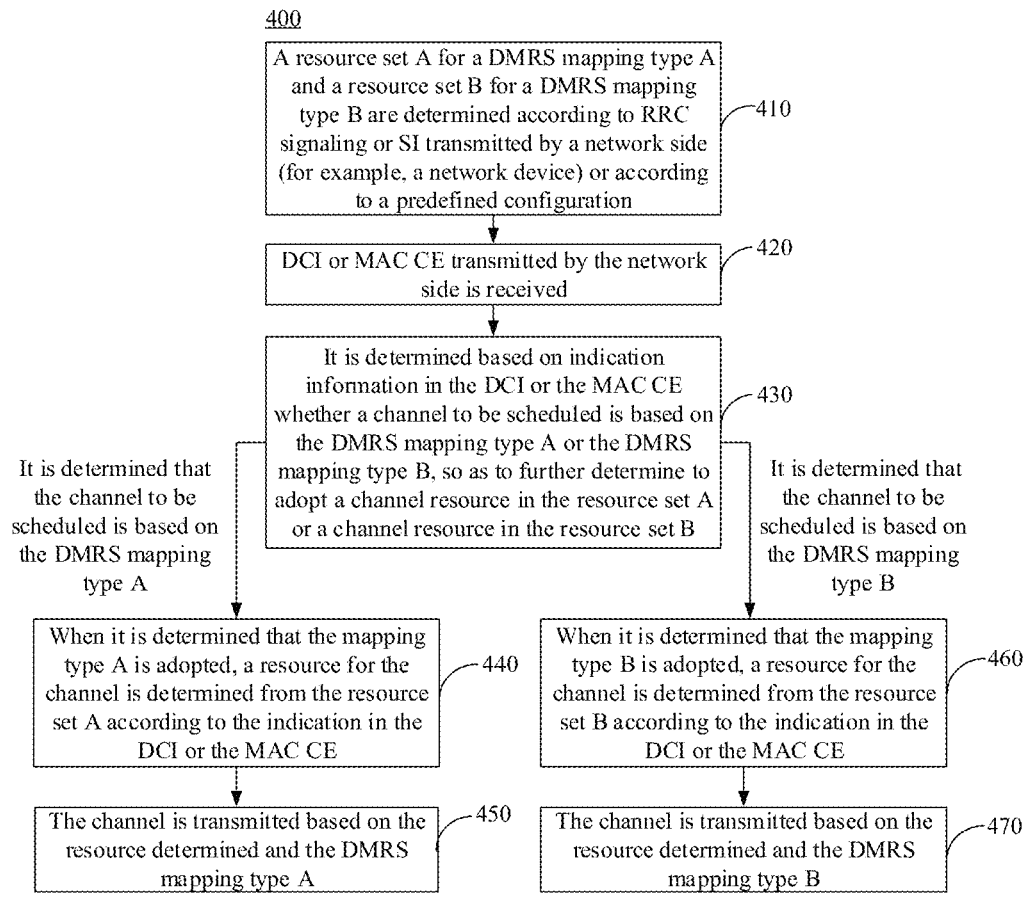
FIG. 8 is a flowchart of still another communication method for channel transmission according to an embodiment of the disclosure.

FIG. 8 is a flowchart of a method 400 for channel transmission according to an embodiment of the disclosure. The method 400 may include at least part of contents in the following contents.

In 410, a terminal device determines a resource set A for a DMRS mapping type A and a resource set B for a DMRS mapping type B, according to RRC signaling or SI transmitted by a network side (for example, a network device) or a predefined configuration.

In 420, the terminal device receives DCI or MAC CE transmitted by the network side.

In 430, the terminal device determines, based on indication information in the DCI or the MAC CE, whether a channel currently scheduled (i.e., the abovementioned first channel) is based on the DMRS mapping type A or the DMRS mapping type B, so as to further determine whether to use a channel resource in the resource set A or a channel resource in the resource set B.

In 440, when it is determined that the DMRS mapping type A is used, a resource for the channel is determined from the resource set A according to the indication in the DCI or the MAC CE.

In 450, the channel is transmitted based on the determined resource and the corresponding DMRS mapping type A.

In 460, when it is determined that the DMRS mapping type B is used, a resource for the channel is determined from the resource set B according to the indication information in the DCI or the MAC CE.

In 470, the channel is transmitted based on the determined resource and the corresponding DMRS mapping type B.

The disclosure provides a method for implicitly indicating a resource set for a control channel or data channel through a DCI format and a scheduling type. Different channel resource sets are used for different DCI formats or scheduling types, so as to improve flexibility of channel resource scheduling on the premise of not increasing a control signaling overhead.

Figure 9:
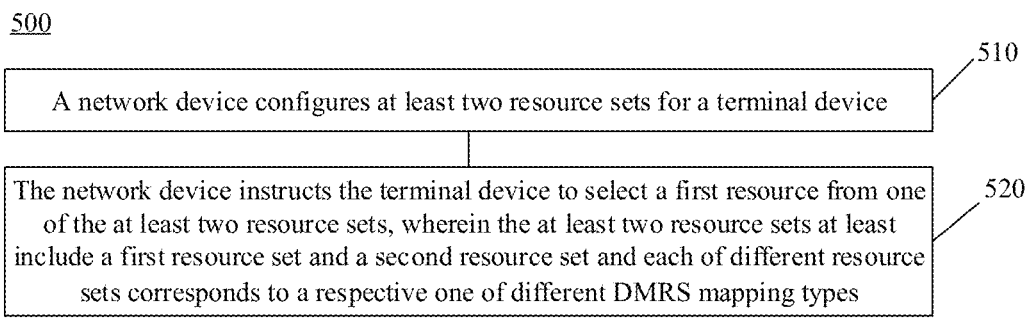
FIG. 9 is a flowchart of yet still another communication method for channel transmission according to an embodiment of the disclosure.

FIG. 9 is a flowchart of a method 500 for channel transmission according to an embodiment of the disclosure. The method may be performed by a network device. The method 500 includes at least part of contents in the following contents.

In 510, the network device configures at least two resource sets for a terminal device.

In 520, the network device instructs the terminal device to select a first resource from one of the at least two resource sets, here, the at least two resource sets at least include a first resource set and a second resource set and each of the at least two resource sets corresponds to a respective one of DMRS mapping types.

In addition, the at least two resource sets are at least partially different in at least one of: a time-domain resource in the resource set, a frequency-domain resource in the resource set, or a code-domain resource in the resource set. Or the at least two resource sets are completely different in at least one of: a time-domain resource in the resource set, a frequency-domain resource in the resource set, or a code-domain resource in the resource set.

The first channel is a PDSCH, a PUSCH or a PUCCH. A second channel is a PDSCH.

The manner in which the at least two resource sets may be determined for the terminal includes the following.

First signaling is transmitted to the terminal device so as to configure configurations of the at least two resource sets.

The network device may transmit the first signaling to the terminal device so as to determine a configuration of at least one of the first resource set or the second resource set.

The network device may transmit the first signaling to the terminal to configure information of the at least one of the first resource set or the second resource set. The configuration of the at least one of the first resource set or the second resource set further include number information of each resource in the corresponding resource set.

Here, the first signaling is RRC signaling or SI.

Furthermore, the manner in which the terminal device may be instructed to select the first resource from the at least two resource sets includes the following.

First control information is transmitted to the terminal device, so as to determine, based on the first control information, the first resource from the one of the at least two resource sets.

Here, the first control information includes number information of the first resource in the first resource set or the second resource set.

Here, the first control information is transmitted based on a format corresponding to a DMRS mapping type.

The first control information includes the number information of the first resource in the one of the at least two resource sets.

Specifically, when the at least two resource sets include the first resource set and the second resource set, the terminal determines the first resource from the first resource set or the second resource set according to the first control information transmitted by the network device.

Here, the first control information includes the number information of the first resource in the first resource set or the second resource set.

The first control information is at least one of DCI or a MAC CE.

In addition, the network side may also indicate the first resource in the following manner. The network device may transmit the first control information based on the format (for example, a DCI format) corresponding to the DMRS mapping type or transmit indication information of the DMRS mapping type to the terminal, so as to indicate whether the terminal determines the first resource from the first resource set or the second resource set. Correspondingly, the terminal device determines the first resource from the one of the at least two resource sets according to the format of the first control information or according to the indication information of the DMRS mapping type from the network side.

The format of the first control information may be the DCI format.

That is, the terminal may determine, according to the format (for example, the DCI format) of the first control information or according to the indication information of the DMRS mapping type or of the scheduling type from the network device, whether the first resource is determined based on the first resource set or based on the second resource set.

In such a manner, according to the technical solution of the embodiment of the disclosure, different resource sets may be configured for different DMRS mapping types, so that corresponding candidate resources may be optimized for different DMRS mapping types. Thus during each scheduling, channel transmission may be performed based on the DMRS mapping types or the DMRS mapping types may be acquired based on resources for channel transmission. Therefore, resource scheduling flexibility may be achieved, and a high signaling overhead may be avoided.

Furthermore, according to the solution, different resource sets may be configured for different scheduling types and DMRS mapping types, so that corresponding candidate resources may be optimized for different scheduling types and DMRS mapping types. Thus, during each scheduling, selection of a resource set and determination of a specific resource are performed based on network-side information (for example, indication information of a scheduling type, indication information of a DMRS mapping type a DCI format corresponding to a DMRS mapping type, and a DCI) and the channel is transmitted on the determined resource. Therefore, the problem that flexibility of resource scheduling of each scheduling type is limited due to unified configurations of one or an aggregate of PUCCH resource sets for multiple scheduling types or corresponding DCI formats (here, configurations of one or an aggregate of PUCCH resource sets mean that configured resources are not distinguished based on DMRS mapping types or scheduling types) is solved. According to the solution of the disclosure, flexibility of the resource scheduling of each scheduling type may be improved, higher efficient resource utilization rate and transmission performance for channel transmission are achieved, and a higher signaling overhead is avoided.

In addition, whether the first resource is determined based on the first resource set or the second resource set may be determined according to existing network-side information (for example, the DCI format, or indication information of the DMRS mapping type or of the scheduling type) without any additional signaling indication, so that the signaling transmission overhead is further reduced.

Figure 10:
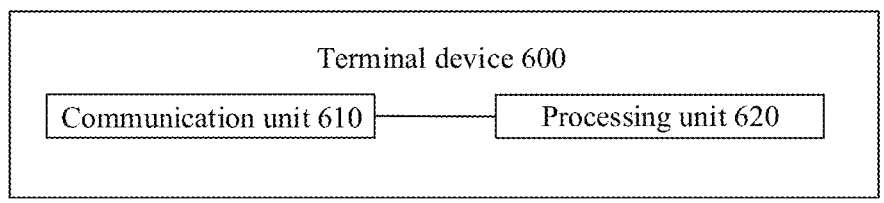
FIG. 10 is a structure diagram of a composition of a terminal device according to an embodiment of the disclosure.

FIG. 10 is a block diagram of a terminal device 600 according to an embodiment of the disclosure. As illustrated in FIG. 10, the terminal device 600 includes a communication unit 610.

The communication unit is configured to transmit a first channel based on a first resource in one of at least two resource sets.

Here, each of the at least two resource sets corresponds to a respective one of DMRS mapping types, and the DMRS mapping types include a type A and a type B.

Here, the first channel is transmitted based on the DMRS mapping type corresponding to the resource set to which the first resource belongs, or the first channel is used for transmitting HARQ ACK information for a second channel and the second channel is transmitted based on the DMRS mapping type corresponding to the resource set to which the first resource belongs.

In the embodiment of the disclosure, each of the at least two resource sets includes at least one of: a time-domain resource, a frequency-domain resource, or a code-domain resource.

In the embodiment of the disclosure, a parameter characterizing a resource in the resource set includes at least one of: a position of a starting symbol, the number of symbols, the number of slots, a frequency-domain resource, or a code-domain resource.

In the embodiment of the disclosure, the at least two resource sets are different each other in at least one of: a type of a parameter characterizing a resource in the resource set, a value range of a parameter of the same type, or the number of values available for a parameter of the same type.

In the embodiment of the disclosure, the at least two resource sets are different each other in the number of positions of starting symbols and in a value range of a position of a starting symbol.

In the embodiment of the disclosure, the at least two resource sets are different each other in a value range of a granularity of resources.

In the embodiment of the disclosure, as illustrated in FIG. 10, the terminal device 600 further includes a processing unit 620.

The processing unit is configured to: determine the at least two resource sets; and determine the first resource from the one of the at least two resource sets.

In the embodiment of the disclosure, the processing unit 620 is further configured to determine configurations of the at least two resource sets based on preset information.

In the embodiment of the disclosure, the processing unit 620 is further configured to determine configurations of the at least two resource sets based on first signaling transmitted by a network side.

In the embodiment of the disclosure, the first signaling is RRC signaling or SI.

In the embodiment of the disclosure, the processing unit 620 is further configured to determine the first resource from the one of the at least two resource sets according to first control information transmitted by the network side.

Here, the first control information includes number information of the first resource in the one of the at least two resource sets.

In the embodiment of the disclosure, the processing unit 620 is further configured to determine, by the terminal device, the first resource from the one of the at least two resource sets according to a format of the first control information transmitted by the network side.

In the embodiment of the disclosure, the first control information is at least one of DCI or a MAC CE.

In the embodiment of the disclosure, the processing unit 620 is further configured to: determine the first resource from the one of the at least two resource sets according to a DMRS mapping type which is indicated by indication information transmitted by the network side or according to a scheduling type which is indicated by indication information transmitted by the network side and which is used in scheduling the first channel or the second channel.

In the embodiment of the disclosure, as illustrated in FIG. 10, the terminal device 600 further includes the processing unit 620.

The processing unit is configured to: when the DMRS mapping type is the type A, determine a position of at least one DMRS symbol according to a starting symbol of a slot in which the first channel or the second channel is transmitted.

In the embodiment of the disclosure, the at least one DMRS symbol is a third time-domain symbol or fourth time-domain symbol of the slot in which the first channel or the second channel is transmitted.

In the embodiment of the disclosure, as illustrated in FIG. 10, the terminal device 600 further includes the processing unit.

The processing unit is configured to: when the DMRS mapping type is the type B, determine a position of at least one DMRS symbol according to a starting symbol of a group of symbols.

Here, the group of symbols includes symbols in which the first channel and a DMRS are transmitted or symbols in which the second channel and a DMRS are transmitted.

In the embodiment of the disclosure, the at least one DMRS symbol is at least one of: a first symbol in the group of symbols; a symbol in the group of symbols and the symbol is within a central range; an odd symbol in the group of symbols; or an even symbol in the group of symbols.

In the embodiment of the disclosure, the at least two resource sets include a first resource set, the DMRS mapping type corresponding to the first resource set is the type A, and a time-domain resource in the first resource set is in units of at least one of slots or symbols.

In the embodiment of the disclosure, the at least two resource sets include a second resource set, the DMRS mapping type corresponding to the second resource set is the type B, and a time-domain resource in the second resource set is in units of symbols.

The terminal device 600 may implement corresponding operations implemented by the terminal device in the above method embodiments and, for simplicity, will not be elaborated herein.

Figure 11:
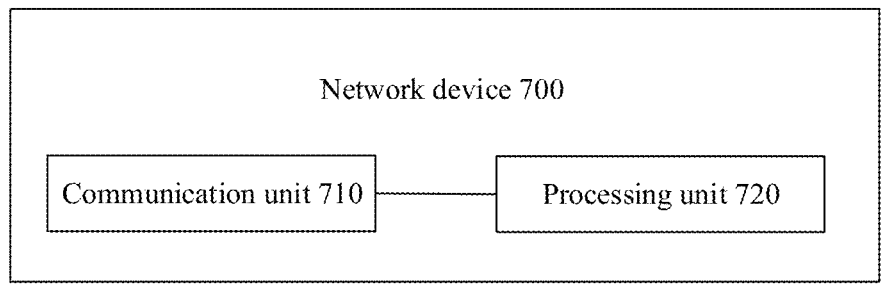
FIG. 11 is a structure diagram of a composition of a network device according to an embodiment of the disclosure.

FIG. 11 is a block diagram of a network device 700 according to an embodiment of the disclosure. As illustrated in FIG. 11, the network device 700 includes a communication unit 710.

The communication unit is configured to receive, based on a first resource in one of at least two resource sets, a first channel transmitted by a terminal device.

Here, each of the at least two resource sets corresponds to a respective one of DMRS mapping types, and the DMRS mapping types include a type A and a type B.

Here, the first channel is transmitted based on the DMRS mapping type corresponding to the resource set to which the first resource belongs, or the first channel is used for transmitting HARQ ACK information for a second channel and the second channel is transmitted based on the DMRS mapping type corresponding to the resource set to which the first resource belongs.

In the embodiment of the disclosure, each of the at least two resource sets includes at least one of: a time-domain, a frequency-domain or a code-domain resource.

In the embodiment of the disclosure, a parameter characterizing a resource in the resource set includes at least one of: a position of a starting symbol, the number of symbols, the number of slots, a frequency-domain resource, or a code-domain resource.

In the embodiment of the disclosure, the at least two resource sets are different in at least one of: a type of a parameter characterizing a resource in the resource set, a value range of a parameter of the same type, or the number of values available for a parameter of the same type.

In the embodiment of the disclosure, the at least two resource sets are different in the number of positions of starting symbols and in a value range of a starting symbol.

In the embodiment of the disclosure, the at least two resource sets are different in a value range of a granularity of resources.

In the embodiment of the disclosure, the communication unit 710 is further configured to indicate the at least two resource sets to the terminal device.

In the embodiment of the disclosure, the communication unit 710 is further configured to transmit first signaling to the terminal device, here, the first signaling is used to indicate configurations of the at least two resource sets.

In the embodiment of the disclosure, the first signaling is RRC signaling or SI.

In the embodiment of the disclosure, the communication unit 710 is further configured to transmit first control information to the terminal device.

Here, the first control information includes number information of the first resource in the one of the at least two resource sets.

In the embodiment of the disclosure, the communication unit 710 is further configured to indicate the first resource to the terminal device based on a format of the first control information.

In the embodiment of the disclosure, the first control information is at least one of DCI or a MAC CE.

In the embodiment of the disclosure, the communication unit 710 is further configured to transmit indication information to the terminal device, here, the indication information is used to indicate a DMRS mapping type or used to indicate a scheduling type based on which the first channel or the second channel is scheduled.

In the embodiment of the disclosure, as illustrated in FIG. 11, the network device 700 further includes a processing unit 720.

The processing unit is configured to: when the DMRS mapping type is the type A, determine a position of at least one DMRS symbol according to a starting symbol of a slot in which the first channel or the second channel is transmitted.

In the embodiment of the disclosure, the at least one DMRS symbol is a third time-domain symbol or fourth time-domain symbol of the slot in which the first channel or the second channel is transmitted.

In the embodiment of the disclosure, as illustrated in FIG. 11, the network device 700 further includes the processing unit.

The processing unit is configured to: when the DMRS mapping type is the type B, determine a position of at least one DMRS symbol according to a starting symbol of a group of symbols.

Here, the group of symbols includes symbols in which the first channel and a DMRS are transmitted or symbols in which the second channel and a DMRS are transmitted.

In the embodiment of the disclosure, the at least one DMRS symbol is at least one of: a first symbol in the group of symbols; a symbol in the group of symbols and the symbol is within a central range; an odd symbol in the group of symbols; or an even symbol in the group of symbols.

In the embodiment of the disclosure, the at least two resource sets include a first resource set, the DMRS mapping type corresponding to the first resource set is the type A, and a time-domain resource in the first resource set is in units of at least one of slots or symbols.

In the embodiment of the disclosure, the at least two resource sets include a second resource set, the DMRS mapping type corresponding to the second resource set is the type B, and a time-domain resource in the second resource set is in units of a symbol.

The network device 700 may implement corresponding operations implemented by the network device in the method embodiments and, for simplicity, will not be elaborated herein.

Figure 12:
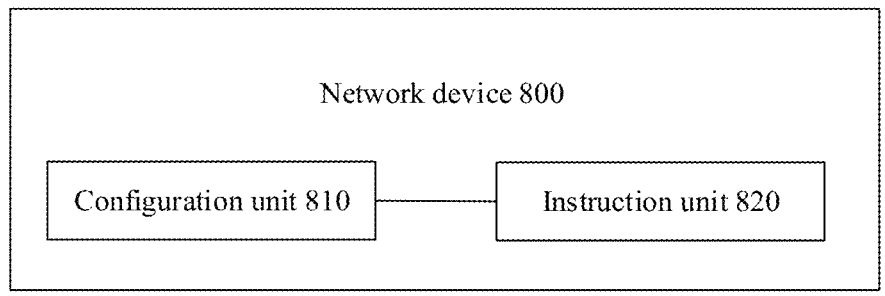
FIG. 12 is a structure diagram of a composition of a network device according to an embodiment of the disclosure.

FIG. 12 is a block diagram of a network device 800 according to an embodiment of the disclosure. As illustrated in FIG. 12, the network device 800 includes a configuration unit 810 and an instruction unit 820.

The configuration unit 810 is configured to configure at least two resource sets for a terminal device.

The instruction unit 820 is configured to instruct the terminal device to select, from one of the at least two resource sets, a first resource for channel transmission.

Here, each of the at least two resource sets corresponds to a respective one of DMRS mapping types.

In the embodiment of the disclosure, each of the at least two resource sets includes at least one of: a time-domain, a frequency-domain resource, or a code-domain resource.

In the embodiment of the disclosure, the configuration unit 810 is further configured to transmit first signaling to the terminal device, here, the first signaling is used to indicate configurations of the at least two resource sets.

In the embodiment of the disclosure, the first signaling is RRC signaling or SI.

In the embodiment of the disclosure, the instruction unit 820 is further configured to transmit first control information to the terminal device, here, the first control information is used to instruct the terminal device to select the first resource from the one of the at least two resource sets.

In the embodiment of the disclosure, the first control information includes number information of the first resource in the resource set to which the first resource belongs.

In the embodiment of the disclosure, a format of the first control information corresponds to the DMRS mapping type corresponding to the resource set to which the first resource belongs.

In the embodiment of the disclosure, the first control information is at least one of a DCI or a MAC CE.

In the embodiment of the disclosure, the instruction unit 820 is further configured to: transmit to the terminal device indication information that indicates a DMRS mapping type or indicates a scheduling type used in scheduling the first channel or the second channel, the indication information is used to instruct the terminal device to select the first resource from the one of the at least two resource sets.

The network device 800 may implement corresponding operations implemented by the network device in the above method embodiments and, for simplicity, will not be elaborated herein.

Figure 13:
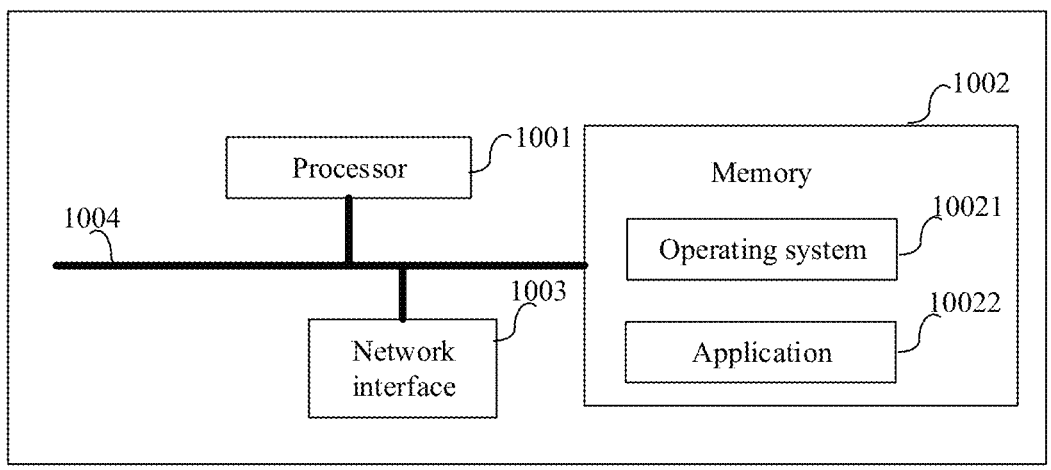
FIG. 13 is a diagram of a hardware architecture according to an embodiment of the disclosure.

An embodiment of the disclosure also provides a structure of a hardware composition of a terminal device or a network device, as illustrated in FIG. 13. The terminal device includes at least one processor 1001, a memory 1002 and at least one network interface 1003. Each component is coupled together through a bus system 1004. It can be understood that the bus system 1004 is configured to implement connection communication between these components. The bus system 1004 includes a data bus and further includes a power bus, a control bus and a state signal bus. However, for clear description, various buses in FIG. 13 are marked as the bus system 1004.

It can be understood that the memory 1002 in the embodiment of the disclosure may be a volatile memory or a nonvolatile memory, or may include both the volatile and nonvolatile memories.

In some corresponding modes, the memory 1002 stores the following elements, executable modules or data structures, or a subset thereof or an extended set thereof: an operating system 10021 and an application 10022.

The processor 1001 is configured to execute corresponding operations executed by the terminal device or the network device in the method embodiments of the disclosure and, for simplicity, will not be elaborated herein.

An embodiment of the disclosure provides a computer storage medium storing a computer-executable instruction that, when executed to implement corresponding operations executed by a terminal device or a network device in the method embodiments of the disclosure. For simplicity, elaborations are omitted herein.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the related art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes, such as a U disk, a mobile hard disk, a Read Only Memory (ROM), a magnetic disk or an optical disk. As a consequence, the embodiments of the disclosure are not limited to any specific hardware and software combination.

The embodiments of the disclosure also provide a computer storage medium storing a computer program, the computer program is configured to execute the method for scheduling data of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for channel transmission, comprising:
determining, by a terminal device, at least two resource sets, wherein the at least two resource sets are different in a value range of a position of a starting symbol;
determining, by the terminal device, a first resource from one of the at least two resource sets according to first control information transmitted by a network side, wherein the first control information comprises sequence number information of the first resource in the one of the at least two resource sets; and
transmitting, by the terminal device, a first channel based on the first resource in the one of the at least two resource sets;
wherein each of the at least two resource sets corresponds to a respective one of Demodulation Reference Signal (DMRS) mapping types; and
wherein the first channel is transmitted based on the DMRS mapping type corresponding to the resource set to which the first resource belongs.

2. The method of claim 1, wherein a parameter charactering a resource in the resource set comprises at least one of: the position of the starting symbol, a number of symbols, a number of slots, a frequency-domain resource, or a code-domain resource.

3. The method of claim 1, wherein the at least two resource sets are different in a number of positions of starting symbols.

4. The method of claim 1, wherein determining, by the terminal device, the at least two resource sets comprises:
determining, by the terminal device, configurations of the at least two resource sets based on preset information.

5. The method of claim 1, wherein the at least two resource sets comprise a first resource set, the DMRS mapping type corresponding to the first resource set is a first type, and a time-domain resource in the first resource set is in units of at least one of slots or symbols.

6. The method of claim 1, wherein the at least two resource sets comprise a second resource set, the DMRS mapping type corresponding to the second resource set is a second type, and a time-domain resource in the second resource set is in units of symbols.

7. The method of claim 1, wherein each of the at least two resource sets comprises at least one of: a time-domain resource, a frequency-domain resource, or a code-domain resource.

8. The method of claim 1, wherein the first control information comprises at least one of Downlink Control Information (DCI) or a Media Access Control (MAC) Control Element (CE).

9. The method of claim 1, further comprising:
when the DMRS mapping type is a first type, determine a position of at least one DMRS symbol according to a starting symbol of a slot in which the first channel or the second channel is transmitted; or,
when the DMRS mapping type is a second type, determine a position of at least one DMRS symbol according to a starting symbol of a group of symbols, wherein the group of symbols comprises symbols in which the first channel and a DMRS are transmitted or symbols in which the second channel and a DMRS are transmitted.

10. A terminal device, comprising a network interface and a processor coupled with the network interface;
wherein the processor is configured to:
determine at least two resource sets, wherein the at least two resource sets are different in a value range of a position of a starting symbol; and
determine a first resource from one of the at least two resource sets according to first control information transmitted by a network side, wherein the first control information comprises sequence number information of the first resource in the one of the at least two resource sets; and
the network interface is configured to transmit a first channel based on the first resource in the one of the at least two resource sets;
wherein each of the at least two resource sets corresponds to a respective one of Demodulation Reference Signal (DMRS) mapping types; and
wherein the first channel is transmitted based on the DMRS mapping type corresponding to the resource set to which the first resource belongs.

11. The terminal device of claim 10, wherein each of the at least two resource sets comprises at least one of: a time-domain resource, a frequency-domain resource, or a code-domain resource.

12. The terminal device of claim 10, wherein the at least two resource sets are different in at least one of: a type of a parameter characterizing a resource in the resource set, a value range of a parameter of a same type, or a number of values available for a parameter of a same type.

13. The terminal device of claim 10, wherein the at least two resource sets are different in a value range of a granularity of resources.

14. The terminal device of claim 10, wherein the first control information comprises at least one of Downlink Control Information (DCI) or a Media Access Control (MAC) Control Element (CE).

15. The terminal device of claim 10, wherein the processor is configured to:
when the DMRS mapping type is a first type, determine a position of at least one DMRS symbol according to a starting symbol of a slot in which the first channel or the second channel is transmitted.

16. The terminal device of claim 10, wherein the processor is configured to:
when the DMRS mapping type is a second type, determine a position of at least one DMRS symbol according to a starting symbol of a group of symbols, wherein the group of symbols comprises symbols in which the first channel and a DMRS are transmitted or symbols in which the second channel and a DMRS are transmitted.

17. The terminal device of claim 16, wherein the at least one DMRS symbol comprises at least one of:
a first symbol of the group of symbols;
a symbol of the group of symbols that is within a central range;
an odd symbol of the group of symbols; or
an even symbol of the group of symbols.

18. The terminal device of claim 10, wherein the at least two resource sets comprise a first resource set, the DMRS mapping type corresponding to the first resource set is a first type, and a time-domain resource in the first resource set is in units of at least one of slots or symbols.

19. The terminal device of claim 10, wherein the at least two resource sets comprise a second resource set, the DMRS mapping type corresponding to the second resource set is a second type, and a time-domain resource in the second resource set is in units of symbols.

20. A non-transitory computer readable storage medium, having stored thereon computer program instructions that, when executed by a processor of a terminal device, cause the processor to perform a method for channel transmission, comprising:

determining at least two resource sets, wherein the at least two resource sets are different in a value range of a position of a starting symbol;

determining a first resource from one of the at least two resource sets according to first control information transmitted by a network side, wherein the first control information comprises sequence number information of the first resource in the one of the at least two resource sets; and transmitting a first channel based on the first resource in the one of the at least two resource sets;

wherein each of the at least two resource sets corresponds to a respective one of Demodulation Reference Signal (DMRS) mapping types; and wherein the first channel is transmitted based on the DMRS mapping type corresponding to the resource set to which the first resource belongs.

\* \* \* \* \*